March 14, 1950 E. FENNESSY ET AL 2,500,809

AUTOMATIC RADIO TRANSMITTING APPARATUS

Filed Feb. 19, 1948 5 Sheets-Sheet 1

INVENTOR.
EDWARD FENNESSY
GRAHAM E. ROBERTS
BY
Walter P Huntley
ATTORNEY

INVENTORS
EDWARD FENNESSY
GRAHAM E. ROBERTS
BY Walter P. Huntley
ATTORNEY

AUTOMATIC RADIO TRANSMITTING APPARATUS

Filed Feb. 19, 1948 5 Sheets-Sheet 3

INVENTOR.
EDWARD FENNESSY
GRAHAM E. ROBERTS
BY
Walter P Huntley
ATTORNEY

AUTOMATIC RADIO TRANSMITTING APPARATUS

INVENTOR.
EDWARD FENNESSY
GRAHAM E. ROBERTS
BY
Walter P Huntley
ATTORNEY

March 14, 1950 E. FENNESSY ET AL 2,500,809

AUTOMATIC RADIO TRANSMITTING APPARATUS

Filed Feb. 19, 1948 5 Sheets-Sheet 5

INVENTORS
EDWARD FENNESSY
GRAHAM E. ROBERTS
BY Walter P. Huntley
ATTORNEY

Patented Mar. 14, 1950 2,500,809

UNITED STATES PATENT OFFICE 2,500,809

AUTOMATIC RADIO TRANSMITTING APPARATUS

Edward Fennessy, Orpington, and Graham Estyn Roberts, Stoneleigh, England, assignors to The Decca Record Company, Limited, London, England, a corporation of Great Britain Application February 19, 1948, Serial No. 9,365
In Great Britain April 29, 1946

5 Claims. (Cl. 250—17)

This invention relates to automatic radio transmitting apparatus, and has particular reference to an emergency transmitting device which may be ejected from an airplane or other mobile vehicle and which operates when so ejected to automatically transmit signals comprising a distress signal and information as to the geographical location of the vehicle at the time the device was ejected therefrom.

One of the principal difficulties encountered in the rescue of passangers and crew of disabled mobile vehicles, and particularly of aircraft which have made forced landings, is the lack of information as to the precise location at which the disaster occurred. Rescue requires quick action which can be had only if the maximum possible rescue forces can be concentrated on the minimum search area.

In case of sudden accidents, the wireless operator often has time to send only the shortest possible message, and in some cases none at all. Furthermore, such messages as are transmitted are often not received. The present invention is intended to overcome these difficulties by providing for the automatic transmission of a distress message which will give complete information as to the geographical position, and which transmissions will continue uninterruptedly for a sufficient length of time to insure their reception.

It is therefore an object of this invention to provide an automatic transmitting apparatus arranged to be carried by an airplane or other mobile vehicle and arranged to transmit a distress signal together with complete positional data whenever the apparatus is ejected from the vehicle.

It is another object of this invention to provide a transmitting apparatus of the character set forth in the preceding paragraph which includes means for maintaining the transmitter aloft for a considerable period of time to insure a lengthy transmission.

It is a still further object of this invention to provide a device of the character set forth hereinbefore which includes a keying device for causing the transmitter to radiate signals comprising in the Morse or other generally understood code a distress signal followed by complete positional data, and to repeatedly transmit the identical message.

It is also an object of this invention to provide a device of the character set forth in the preceding paragraph which includes means for presetting the keying mechanism to transmit the appropriate message, the means for presetting being operated as an incident to the ejection of the apparatus from the vehicle.

Other objects and advantages of this invention will be apparent from a study of the following specification, read in connection with the accompanying drawings, wherein.

Figure 1:
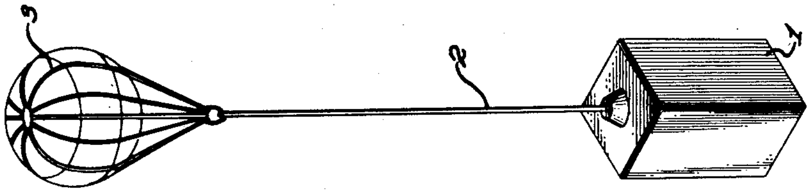
Fig. 1 is an elevational view illustrating the appearance of the apparatus when it is in use.

Referring to the drawings, the preferred embodiment of this invention is illustrated as comprising a self-powered radio transmitting apparatus which is enclosed within an airtight and watertight housing 1 and from which extends a cable or conductor 2 serving as a transmitting antenna. To the upper end of the aerial 2 there is secured a supporting device which is shown in Fig. 1 as comprising a balloon 3 which serves to support the weight of the housing 1 and conductor 2. Alternatively, the balloon 3 may be supplemented by a parachute and the balloon may be made smaller so as to support only the weight of the conductor 2, or if desired, a single parachute may be used as the supporting device. In such case, the housing 1 must be of such size as to be buoyant so that in the event the apparatus is lowered into the water it will not sink.

Figure 2:
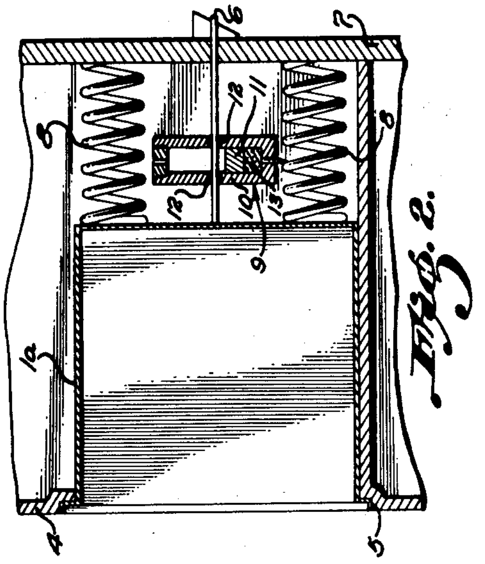
Fig. 2 is a fragmentary sectional view illustrating the manner in which the device is arranged to be ejected from the vehicle.

When not in use, the balloon 3 is of course uninflated, and the entire mechanism is mounted in the side of the craft in the manner, for example, illustrated in Fig. 2. The side of the craft, shown at 4, is provided with an opening 5 which is just filled by a housing 1a which contains the housing 1, the conductor 2, the supporting device 3, and other instrumentalities described hereinafter. The housing 1a is held in place by means of a tension member 6, such as a length of piano wire, one end of which is secured to the housing 1a and the other end of which is secured to an inner bulkhead or partition 7 of the craft. One or more heavy compression springs 8 interposed between the housing 1a and the bulkhead 7 serve to continuously urge the housing 1a outwardly against the restraint of the tension member 6.

When it is desired to eject the housing 1a from the craft, the tension member 6 is severed by a severing device 9. This device may comprise a cylinder 10 within which is slidably mounted a piston 11. The cylinder 10 is provided with aligned transverse bores 12 through which the wire 6 passes, and the cylinder and piston are made of sufficiently hard material to effectively shear the wire upon movement of the piston past the bores 12. Such movement of the piston is effected by means of a small charge 13 of explosive confined between the piston and the closed end of the cylinder 10. The explosive charge 13 conveniently takes the form of an electric blasting cap of the delay type which comprises an electric igniter, a delay train, and a small explosive charge. Such caps may be obtained with delay times from energization of the igniter or squib to the firing of the explosive charge ranging from a fraction of a second to a number of seconds. Thus, upon energization of the igniter, a small time delay ensues, after which the explosive charge fires to move the piston 11 and shear the wire 6. The shearing of the wire 6 releases the housing 1 and allows the springs 8 to forcibly eject the housing 1a from the craft.

Figures 3, 13:
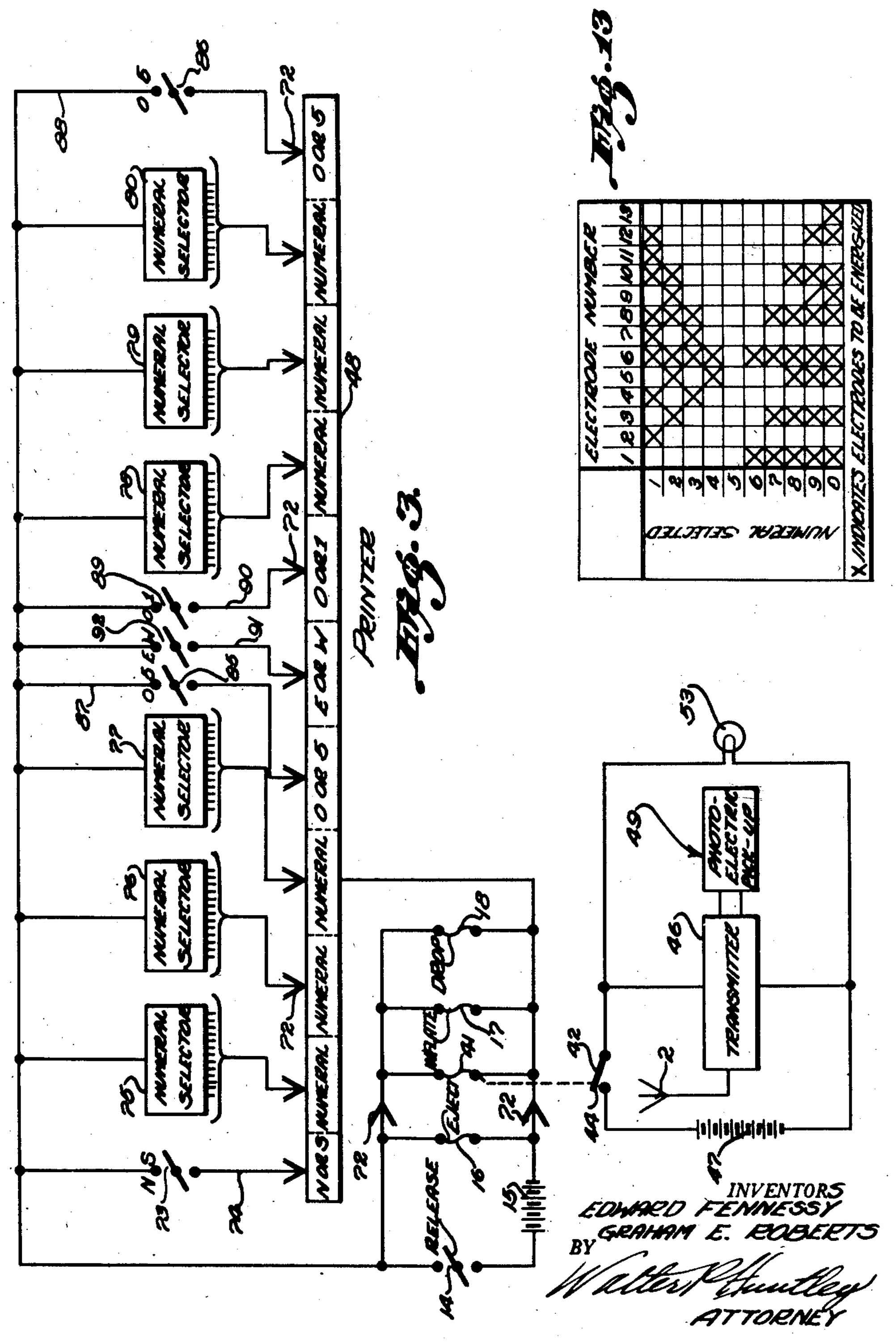
Fig. 3 is a wiring diagram illustrating the electrical devices and connections employed in the control apparatus.
Fig. 13 is a chart showing the contact arrangement required for a group of selector switches controlling the operation of the printing mechanism.

The explosive charge is fired by the navigator of the craft, or other officer, as a result of the closing of a switch 14. As is shown in Fig. 3, the switch 14 is connected in circuit with a suitable source of power such as a battery 15, and the igniter element above mentioned (represented in Fig. 3 by the reference character 16). Two other delay blasting caps, 17 and 18, are connected in parallel with the element 16. The igniter 17 is used to effect the inflation of the balloon 3. To this end there is provided a tank or pressure vessel 19 filled with hydrogen under pressure. The vessel 19 is releasably secured to the housing 1 and mounted within the housing 1a in a manner which will be explained hereinafter, and is provided with a valve 20 which is held in a closed position by means of a tie wire 21. The tie wire 21 is passed through a severing device 22 identical to the device 9 described in connection with Fig. 2 and containing the explosive associated with the igniter element 17. Thus, after a suitable delay to allow the housing 1a to clear the craft, the tie wire 21 is severed to allow the valve 20 to be opened by the pressure of the gas within the cylinder 19.

The gas thus released flows through a discharge nipple 23, a releasable coupling 24, a check valve 25, and into the balloon 3 which is suitably secured to the check valve 25, thus inflating the balloon. By properly placing the various components within the housing 1a, the inflation of the balloon 3 may be used to push all of the parts out of the housing 1a, thus allowing the housing 1a to fall away free of the rest of the parts.

Figure 6:
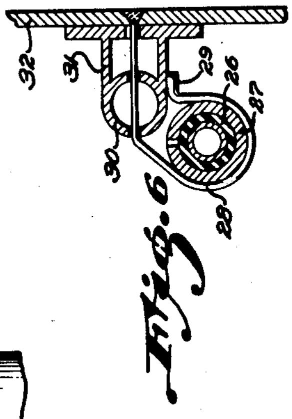
Fig. 6 is a sectional view taken along the line 6—6 of Fig. 5.

The releasable coupling 24 is illustrated in Fig. 6 as comprising a sleeve 26 of rubber or similar material surrounding the nipple 23 and check valve 25. The sleeve 26 is bound tightly by means of a flexible metal band 27 which is held in place by means of a tie wire 28. One end of the tie wire 28 is firmly fixed as shown at 29 to a severing device 30 (identical to the severing device 9) which in turn is secured to a supporting bracket 31. The free end of the tie wire 28 is passed around the metal band 27, through the severing device 30, and is secured to a wall 32 of the housing 1 as by soldering, brazing, or other suitable means. By drawing the tie wire 28 very tight before fixing, the metal band is tightened around the rubber sleeve 26 so as to securely join the nipple 23 to the check valve 25, and the entire assembly is also secured to the housing 1.

When the severing device 30 is operated to sever the tie wire 28, the connection between the check valve 25 and the nipple 23 is broken to free the balloon 3, and the support for the gas bottle 19 is removed so that the bottle falls freely away from the housing 1. In order that this operation may take place after the balloon 3 is fully inflated, the explosive charge for the severing device 30 is provided with the appropriate delay, the igniter 18 therefor being connected in parallel with the igniter 17 as shown in Fig. 3.

To summarize the operation of the apparatus thus far described, it is seen that as soon as the switch 14 is closed, the igniters 16, 17, and 18 are energized. The severing device 9 associated with the igniter 16 is the first to operate, and in so doing effects the ejection of the entire assembly within its outer temporary housing 1a from the craft in which it is carried. After a suitable delay, the severing device 22 associated with the igniter 17 operates to open the gas valve and cause the balloon 3 to be inflated. When sufficient time has elapsed for the balloon to become fully inflated, and to allow the swelling of the balloon to push off the outer housing 1a, the severing device 30 associated with the igniter 18 operates to disconnect the balloon from the gas bottle, and to release the bottle from the transmitter housing. At this time, the balloon rises as far as the antenna cable 2 will permit, the same having been wound on a reel (not shown) or other suitable storage means. At the same time, the gas bottle falls freely from the transmitter housing, so that at the completion of the sequence of operations just described, the parts occupy the positions shown in Fig. 1, and the device is in readiness for the automatic transmitter to start transmitting the distress signals.

Figure 4:
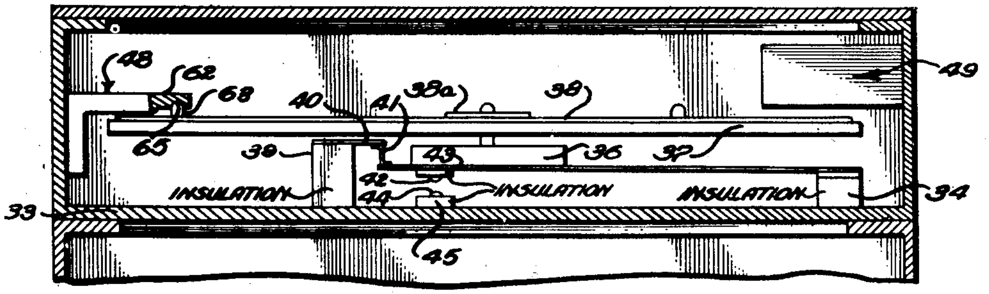
Fig. 4 is a fragmentary sectional view of the transmitting apparatus showing the keying mechanism.
Figure 9:
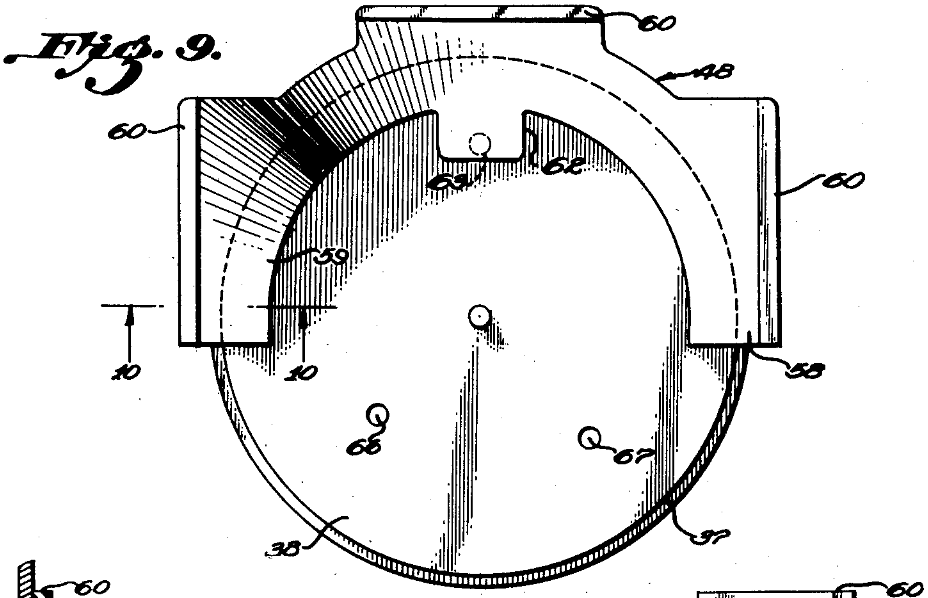
Fig. 9 is a plan view of a part of the apparatus shown in Fig. 4 and illustrating the printing device which is used to print a part of the message on the card of Fig. 7 at the time of ejection.

The transmitter proper may be of any suitable construction, arranged to operate from batteries mounted within the housing 1, and as such devices are well known, the same is not described herein. However, this invention provides a novel mechanism for causing the transmitter to transmit the desired message. This mechanism is housed within a part of the housing 1, as is shown in Fig. 4, and includes a base member 33 upon which the parts may be mounted. An insulating support 34 carries a flexible leaf spring 35 upon the end of which is secured a small spring wound clock-work 36, which may comprise an ordinary wrist watch movement. The clock-work 36 is of the type having a sweep-second shaft which makes one revolution each minute. To this shaft, there is secured a turntable 37, upon which is placed a printed card 38. The card 38 may be held in place as by means of a spring clip 38a engaging the turntable shaft.

Near the end of the spring 35, there is placed an insulating support 39 from the top of which extends a projection 40 in a position to overlie the end of the spring 35. A short length of fusible wire 41 interconnects the end of the spring 35 with the projection 40 and serves to hold the spring 35 in a stressed or flexed position. To the underside of the spring 35 there is secured a contact member 42 which is insulated from the spring 35 as by means of an insulator 43. Directly below the contact member 42, a second contact member 44 is mounted upon an insulating support 45, so that when the fusible wire 41 is melted, the spring 35 will deflect its end downwardly to cause the engagement of the contact members 42 and 44.

As is shown in Fig. 3, the fusible wire 41 is connected in parallel with the igniter 16, so as to be fused upon closing of the switch 14. The contacts 42 and 44 are connected as a switch in circuit with the transmitter (represented in Fig. 3 by the rectangle bearing the reference character 46) and its own batteries which are represented at 47. Thus when the switch 14 is closed, the fusible wire 41 is melted, the spring 35 deflects downwardly to close the contacts 42—44, and the transmitter is placed in operation. At the same time, the downward movement of the spring 35 draws the turntable 37 out of engagement with a recording assembly 48 (to be described in detail hereinafter) to allow the clock-work 36 to begin the rotation of the turntable 37.

Figure 8:
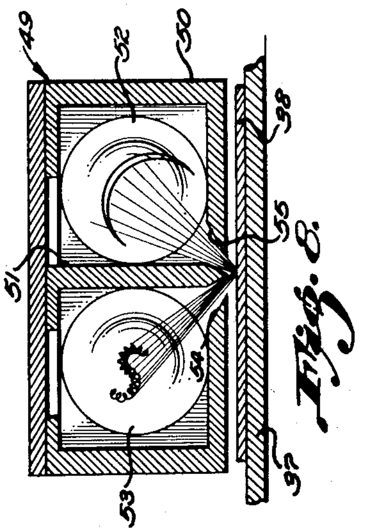
Fig. 8 is a sectional view showing the arrangement of a light source and photo-cell used in conjunction with the card of Fig. 7 in the keying device.
Figure 5:
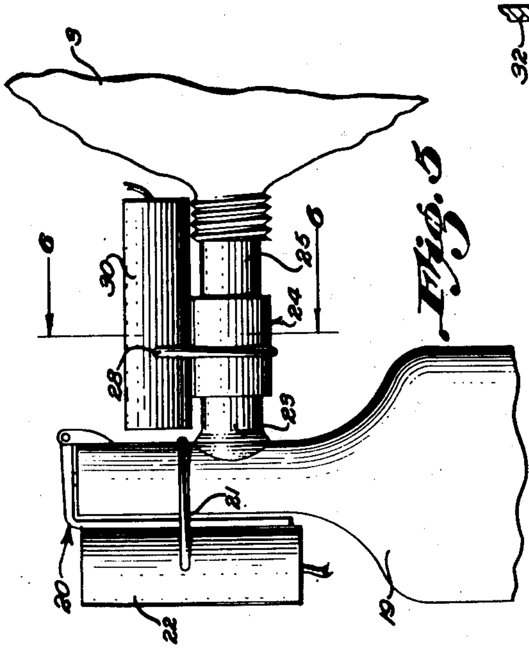
Fig. 5 is a fragmentary elevational view showing a balloon inflation and release apparatus.

As will be explained hereinafter, the card 38 which is mounted upon the turntable 37 bears certain printed markings which are representative of the message to be transmitted. The markings are translated by means of a photo-electric pick-up 49 which correspondingly keys the transmitter. The photo-electric pick-up 49 comprises a housing 50 (see Fig. 8) which is divided into two compartments by a central barrier 51. In one of the compartments there is placed a photo-electric cell 52, and in the other there is placed an electric lamp 53. The bottom of the housing 50 is so apertured as to allow a narrow strip of light from the lamp 53 to fall upon the card 38, and to allow the light reflected from the card to enter the photo-electric cell 52. At the same time, the partition 51 serves to divide the aperture into two slots 54 and 55 so disposed as to prevent light from the lamp 53 directly reaching the photo-electric cell 52. The lamp 53 is connected in parallel with the transmitter power supply so as to be turned on by the closing of the contacts 42—44. Thus as the card 38 is rotated by the clock-work 36, the amount of light falling on the photo-electric cell 52 is varied in accordance with the printed markings as they pass successively beneath the slots 54 and 55. By means of suitable amplifiers and relays, the fluctuating output from the photoelectric cell 52 is caused to correspondingly key the transmitter off and on.

Figure 7:
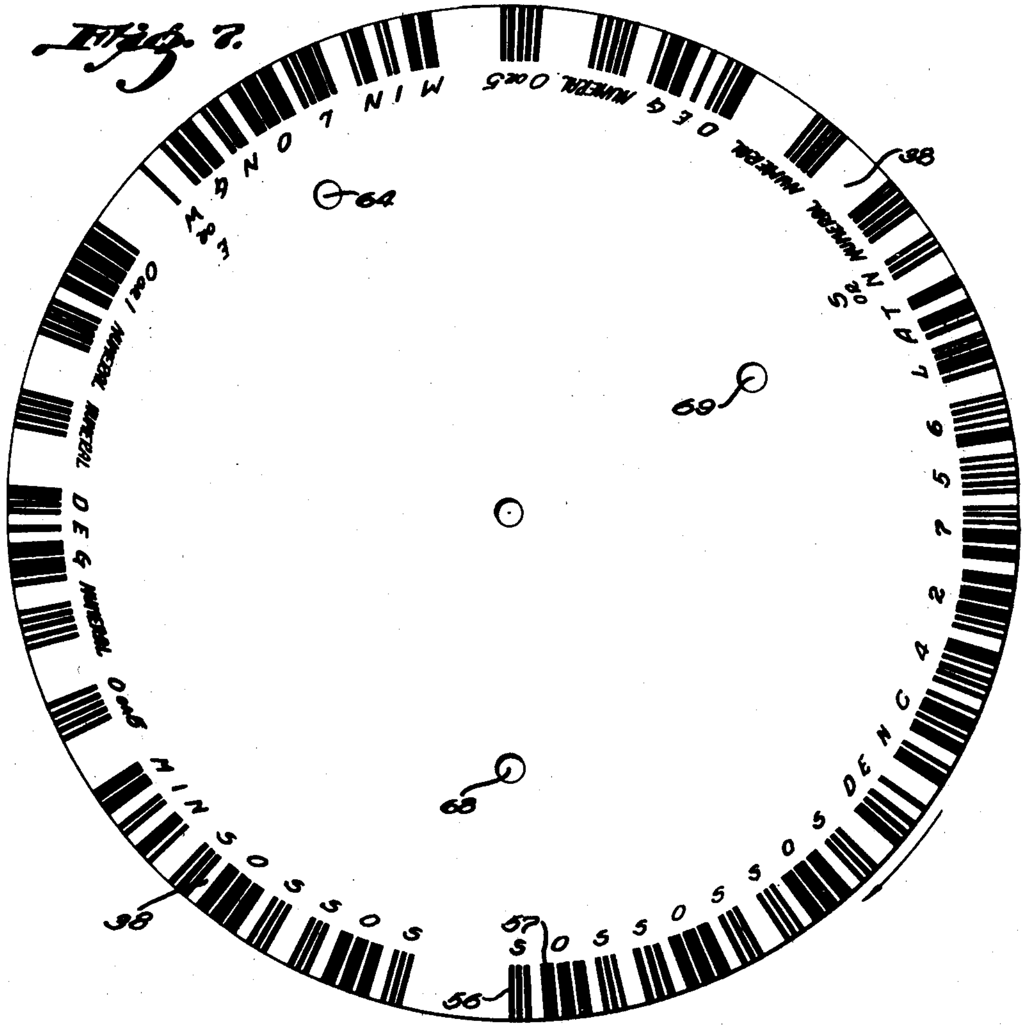
Fig. 7 represents a printed card which is used in the automatic keying device.

The printed card 38 is illustrated in Fig. 7 and may comprise a stiff paper card upon one face of which may be printed a series of radial marks extending inwardly from the edge of the disc a short distance. These marks are all of the same length, but vary in width and spacing, as do the elements of the Morse code. The narrow marks such as shown at 56 may have an angular width of $\frac{1}{2}^\circ$ to represent a dot, and the marks 57 representative of dashes may have a width of $1\frac{1}{2}^\circ$. Dots and dashes are spaced $\frac{1}{2}^\circ$, individual complete characters are spaced $1\frac{1}{2}^\circ$, and words are spaced 3° or more. With a disc diameter of 6 inches, the $\frac{1}{2}^\circ$ width is about 0.025 inch, allowing a slot width for the slots 54 and 55 of about $\frac{1}{32}$ of an inch. The card has a capacity of 720 Morse elements, and at the rotational speed of one revolution per minute causes the message to be transmitted at a speed of about 18 words per minute.

Preferably, the message which is printed on the card consists of three parts; i. e. a distress call, the identification of the craft originating the call, and complete positional information. It will be seen that the first two parts of the message may be printed on the card before it is installed in the apparatus. As will be shown, a part of the positional data may also be printed ahead of time, and amended at the last minute. The markings which are illustrated in Fig. 7 comprise the following message in the International Morse code: "SOS SOS SOS de NC42756 lat S 5 5 deg 5 5 min long E 15 5 deg 5 5 min SOS SOS." The underscored portions are those which are amended at the last minute to correctly state the position of the craft at the time the transmitter is placed in operation.

The amendment of the printed message is effected by the printing or recording device 48 which is shown in Figs. 4, 9, 10, and 11, and which comprises a semi-circular supporting member 58 arranged with a portion 59 overlying the disc 38 and formed integrally with one or more upstanding flange portions 60 by means of which the device 48 is secured to the walls 61 of the housing 1. From the central portion of the support 58, a portion 62 extends inwardly over the card 38 to overlie a locating pin 63 which rises from the turntable 37 and passes through a hole 64 in the card 38. The upper end of the pin 63 is received in a shallow depression 63 formed in the under side of the extension 62 and thus serves to hold the turntable against rotation and in an indexed position until the fusible wire 41 is melted to allow the turntable to move downwardly a distance sufficient to withdraw the pin from the depression. The pin 63 also cooperates with similar pins 66 and 67 carried by the turntable 37 and passing through holes 68 and 69 in the card 38 to index the position of the card relative to the turntable, and therefore also with respect to the printing device 48.

Figure 10:
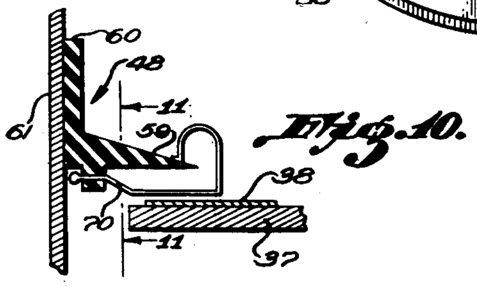
Fig. 10 is a fragmentary sectional view taken along the line 10—10 of Fig. 9.
Figure 11:
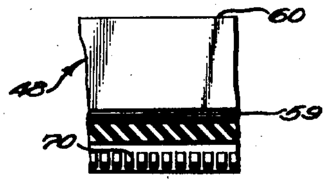
Fig. 11 is a sectional view taken along the line 11—11 of Fig. 10.

At circumferential positions around the overlying portion 59 corresponding to the locations of the underscored portions of the quoted message, the support 58 carries a plurality of contact members or recording electrodes 70. These members comprise flat strips of metal placed flatwise and radially and preferably molded into the insulating material of which the support 58 is made. The center to center spacing of the members 70 corresponds to the width of a Morse dot printed on the card (in the specific example described, the members 70 would be spaced 0.025 inch), and have a circumferential thickness only slightly less, so as to leave a space between adjacent members ranging from 0.005 to 0.008 inch. In some cases, as will be explained with reference to Fig. 12, certain of the members 70 have a thickness corresponding to the width of two Morse dots, while others have a thickness corresponding to a Morse dash. The under edge surfaces of all of the members 70 are caused to lie in the same plane, and are preferably formed as shown in Fig. 10 to give them vertical compliance, so that when the turntable 37 is in its upper position as shown in Fig. 4, the card 38 will be held in intimate contact with the turntable and with all of the members 70.

The card 38 is preferably made from chemically treated paper of any of the well known types having the property of being permanently marked by applying a suitable electrical potential to electrodes placed on opposite sides of the paper. Such papers are commonly used in remote writing and facsimile apparatus. Thus by applying a suitable potential between the turntable 37 and selected ones of the members 70 just before the apparatus is ejected from the craft, additional marks may be printed on the card.

Figure 16:
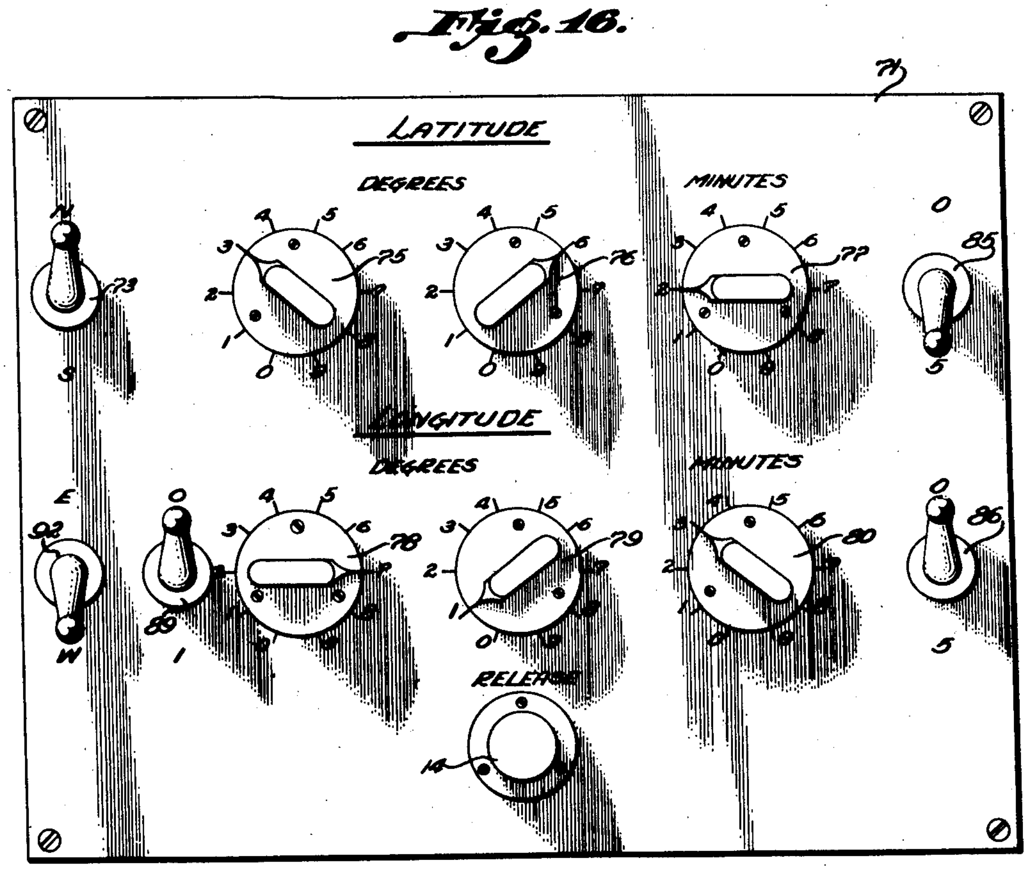
Fig. 16 is a face view of the control panel.
Figure 12:
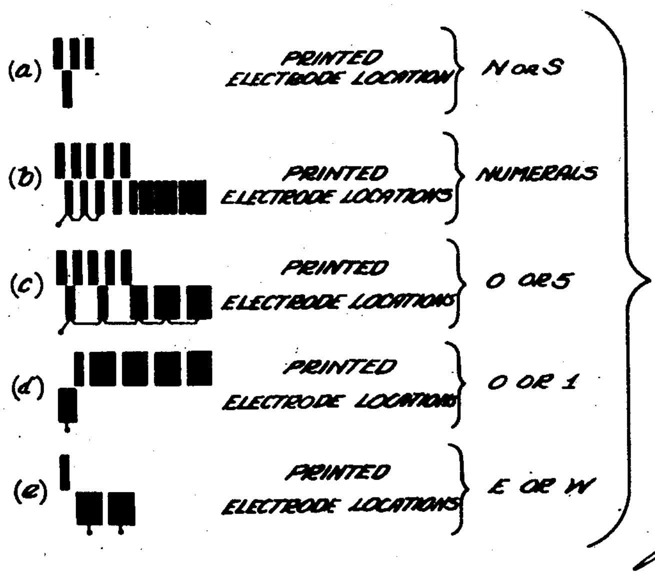
Fig. 12 is a diagram showing the relation between the printing elements and the material previously printed on the card of Fig. 7.

The selecting circuits are shown in Fig. 3, the arrangement of the switches on the control panel is shown in Fig. 16, and the relation between each of the printing electrodes 70 and the material previously printed on the card 38 is shown in Fig. 12. The control panel, represented at 71 in Fig. 16, may be located as desired in the craft and connection made with wires to the apparatus enclosed within the housing 1. These connections are broken at suitable plug and jack connectors 72 (Fig. 3) at the time the housing 1 is ejected. The first variable part of the message is either "N" or "S" to indicate north or south latitude. The appropriate letter is selected by a switch 73 which is connected in a circuit 74 between the switch 14 and one of the recording electrodes 70. Since the "S" is already printed on the card 38, the switch 73 is off in the "S" position, and on in the "N" position.

As is shown at (a) in Fig. 12, the recording electrode 70 is located between the first two dots of the Morse "S," so that when energized, a mark is made on the card 38 which completely fills the space between the two dots so as to form a dash and thus convert the printed "S" to the Morse "N." To convert each of the printed "5's" occurring just before the degrees notation "deg," into the appropriate numerals, thirteen recording electrodes are used (twelve narrow and one double width), spaced with reference to the five printed dots as shown at (b) in Fig. 12. The chart comprising Fig. 13 shows the electrodes which must be energized to convert the printed five into each of the other numbers. For example, to convert the five into a four, electrodes five and six are energized to triple the width of the last dot into a dash. There are thus required six selector switches, each capable of connecting the load side of the switch 14 to each of the nine combinations of thirteen outgoing conductors represented in Fig. 13. The six switches required are represented in the drawings at 75, 76, 77, 78, 79, and 80, and correspond to the numerals in the tens and units columns of degrees and the tens column of minutes for each of latitude and longitude.

Another pair of such selectors could be used for the units columns of minutes, but since it is felt that giving the position to the nearest five minutes is sufficiently accurate, this has been done in order to somewhat simplify the apparatus, as will be made evident hereinafter.

Figure 14:
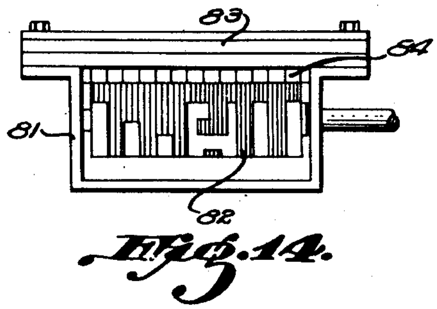
Fig. 14 is a side elevational view of one form of selector switch which may be used.
Figure 15:
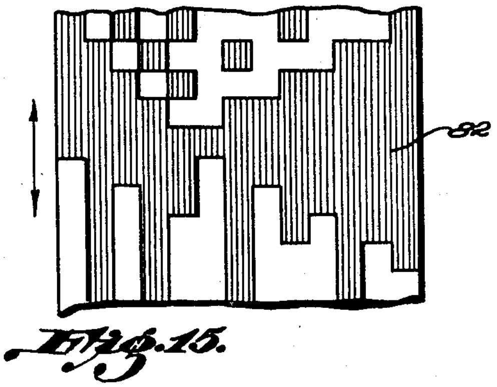
Fig. 15 is a development of the cylindrical drum contact used in the switch shown in Fig. 14.

The selector switches 75—80 may be of any suitable type, but a preference is expressed for the simple form of construction which is illustrated in Figs. 14 and 15. The switch shown in these figures comprises a supporting frame 81 within which is rotatably mounted a drum 82. The drum 82 provides an arrangement of electrically conductive and non-conductive areas such as is represented by the development shown in Fig. 15. Above the drum 82 there is mounted an insulating brush holder 83 which supports thirteen brushes 84 spaced uniformly along the length of the drum 82. The switch may be made very small, using a drum diameter of about ¼ inch and a brush diameter of $\frac{1}{32}$ inch. The insulating areas of the drum may be formed on a drum made of copper or similar material by first etching the copper cylinder with a pattern such as is shown in Fig. 15, and then filling the etched areas with a suitable plastic insulating material. After molding, the excess insulating material may be turned off to expose the conductive areas.

The arrangement of recording electrodes for converting the printed five in the units columns of the minutes category is shown at (c) in Fig. 12. While five electrodes are required, these are all connected together. Switches 85 and 86 are provided on the control panel and are connected in circuit between the switch 14 and the appropriate groups of recording electrodes as represented at 87 and 88 in Fig. 3. Since the "5" is already printed on the card, the off positions of the switches 85 and 86 are so marked, and the on positions are marked "O."

As the numeral in the hundreds column of the degrees longitude category must either be one or zero, only one electrode is required to convert the printed one to a zero, the electrode being placed as shown at (d) in Fig. 12. A switch 89 is provided on the control panel and connected in a circuit 90 between the switch 14 and the recording electrode shown at (d) in Fig. 12. The off position of the switch is marked "1" as this numeral is already printed on the card 38, and the on position is marked "O."

The "E" notation for east longitude is printed on the card 38, and may be converted to a "W" for west longitude by means of a pair of interconnected recording electrodes spaced as shown at (e) in Fig. 12. These electrodes are connected by a circuit 91 to a switch 92 provided on the control panel and connected to the switch 14. The off position of the switch 92 is marked "E" and the on position is marked "W."

In operating the apparatus, it is of course necessary for the operator to know the position of the craft in terms of latitude and longitude. To save time and in the interests of preparedness, the navigator would ordinarily reset the switches on the control panel each time the position of the craft were determined, so that only slight changes would be required at the time of an accident. While the invention has been described with reference to preferably transmitting positional information in terms of latitude and longitude because of its universality, it falls within the scope of this invention to transmit numerals representative of the position of the craft in any other coordinate system; i. e. such as is established by any of the known forms of radio navigational aids. At the time of an accident, the operator of the apparatus merely assures himself that the dials and switches on the control panel correctly represent the last known position of the craft, and then closes the switch 14.

The closing of the switch causes the printed message on the card to be amended to correctly state the position as represented by the switch positions, the apparatus to be ejected from the craft, the balloon to be inflated, the balloon to be released and the gas bottle dropped, and the transmitter to be placed in operation. The transmitter will then continue to operate so long as the batteries last, a period of an hour or more.

The invention has been described with reference to manually setting the switches on the control panel to correspondence with the known position of the craft. As will be understood by those skilled in this art, the switch settings may be effected automatically in those cases where the craft carries a radio navigational aid of the type where the coordinate position of the craft is indicated on meters, merely by connecting the meters to the switch operators through suitable torque multiplying apparatus.

In the foregoing there has been described an automatic transmitting apparatus which functions upon initiation to continuously transmit a distress signal followed by complete positional data. Attention is particularly directed to the automatic sequential operation which reduces the operator's duties to merely checking the indicated position and throwing a switch. Attention is also called to the unique way in which the transmitter is keyed to send a message which is not finally composed until the instant the apparatus is ejected from the craft.

While the preferred embodiment of the invention has been shown and described herein, the same is not to be limited to the described details of construction, except as defined in the appended claims.

We claim:

1. In an automatic transmitter to be carried by a mobile vehicle, the combination of: a housing containing a self-powered radio transmitter; a container of gas under pressure; a normally deflated balloon; a first releasable means connecting said balloon to said container and securing said container to said housing; a normally open valve means between said container and said balloon; a second releasable means for holding said valve closed; manually operable means in said vehicle for ejecting said housing, container and balloon from said vehicle; and a pair of time delay means connected to be initiated by operation of said manually operable means and operable after a time delay to release in timed sequence said second and said first releasable means.

2. In an automatic transmitter to be carried by a mobile vehicle, the combination of: a housing containing a self-powered radio transmitter; a container of gas under pressure; a normally deflated balloon; a first releasable means connecting said balloon to said container and securing said container to said housing; a normally open valve means between said container and said balloon; a second releasable means for holding said valve closed; manually operable means in said vehicle for ejecting said housing, container and balloon from said vehicle; a pair of time delay means connected to be initiated by operation of said manually operable means and operable after a time delay to release in timed sequence said second and said first releasable means; and switch means operated by said manually operable means for placing said transmitter in operation.

3. In an automatic transmitter to be carried by a mobile vehicle, the combination of: a housing containing a self-powered radio transmitter; a transmitting antenna conductor connected to said housing; means for holding said antenna aloft after ejection of said housing from said vehicle; a recording medium having recorded thereon a predetermined portion of a message to be transmitted; means for recording on said recording medium the remaining portion of said message; translation means for reproducing the material recorded on said recording medium; means for coupling said translation means to said transmitter for causing said transmitter to radiate signals representative of the message recorded on said recording medium; control means for ejecting said housing from said vehicle; and means operated by said control means for actuating said recording means.

4. In an automatic transmitter to be carried by a mobile vehicle, the combination of: a housing containing a self-powered radio transmitter; a transmitting antenna conductor connected to said housing; means for holding said antenna aloft after ejection of said housing from said vehicle; a recording medium bearing indicia representative of the Morse code translation of a predetermined portion of a message to be transmitted; recording means for recording on said medium additional indicia representative of the Morse code translation of the remaining portion of said message; means for moving said recording medium; a photoelectric pick-up adjacent said medium for translating said indicia into corresponding variations of an electric current; keying means connecting said pick-up to said transmitter; control means for ejecting said housing from said vehicle; and means operated by said control means for actuating said recording means.

5. In an automatic transmitter to be carried by a mobile vehicle, the combination of: a housing containing a self-powered radio transmitter; a transmitting antenna conductor connected to said housing; means for holding said antenna aloft after ejection of said housing from said vehicle; a recording medium bearing indicia representative of the Morse code translation of a predetermined portion of a message to be transmitted; a plurality of recording elements each independently operable upon energization to record additional indicia on said recording medium; means for moving said recording medium; a photo-electric pick-up adjacent said medium for translating said indicia into corresponding variations of an electric current; keying means connecting said pick-up to said transmitter; control means for ejecting said housing from said vehicle; selector means for preselecting any of a plurality of combinations of said recording elements to be energized, each of said combinations corresponding to Morse code translations of different ones of a plurality of predetermined remaining portions of said message; and means operated by said control means for energizing those of said recording elements selected by said selector means.

EDWARD FENNESSY.
GRAHAM ESTYN ROBERTS.

(References on following page)

REFERENCES CITED

The following references are of record in the file of this patent:

UNITED STATES PATENTS

| Number | Name | Date |
|---|---|---|
| 1,438,567 | Winstanley, Jr. | Dec. 12, 1922 |
| 1,836,495 | Paulson | Dec. 15, 1931 |
| 2,060,778 | Finch | Nov. 10, 1936 |
| 2,149,808 | Ellis | Mar. 7, 1939 |
| 2,323,064 | Lustfield | June 29, 1943 |
| 2,328,208 | Friedman | Aug. 31, 1943 |
| 2,389,786 | Kohn | Nov. 29, 1945 |
| 2,470,783 | Mead | May 24, 1949 |
| 2,473,050 | Camp | June 14, 1949 |